Oct. 25, 1932.  T. J. SMULSKI  1,885,051
GAUGE
Filed Nov. 8, 1926    2 Sheets-Sheet 1

Witness:
William P. Kilroy

Inventor:
Theodore J. Smulski
By

Oct. 25, 1932.  T. J. SMULSKI  1,885,051
GAUGE
Filed Nov. 8, 1926   2 Sheets-Sheet 2
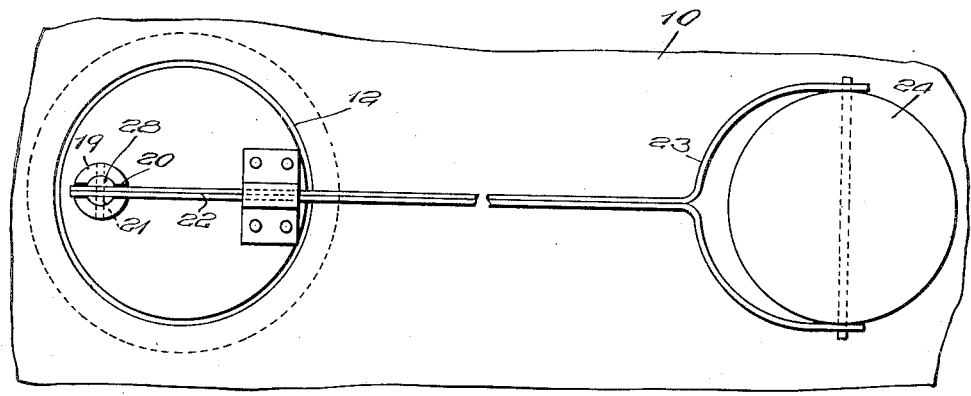
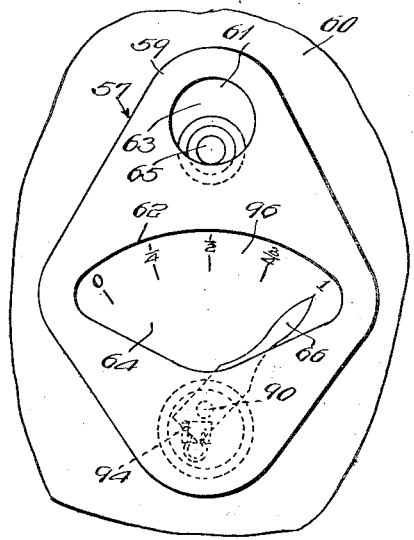
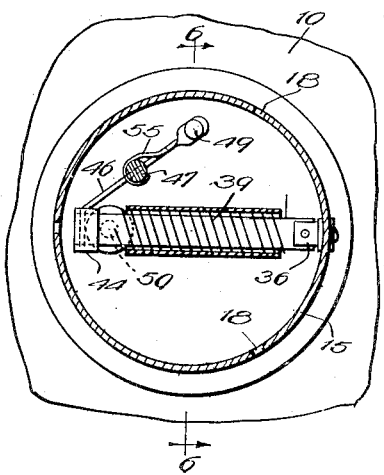
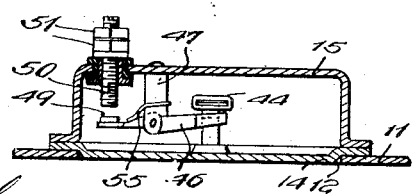
Inventor:
Theodore J. Smulski Patented Oct. 25, 1932

1,885,051

UNITED STATES PATENT OFFICE

THEODORE J. SMULSKI, OF LAKE ZURICH, ILLINOIS, ASSIGNOR TO THE ANDERSON CO., OF GARY, INDIANA, A CORPORATION OF INDIANA

GAUGE

Application filed November 8, 1926. Serial No. 147,076.

My invention relates to gauges and has among its other objects the production of devices of the kind described which are compact, convenient, durable, and satisfactory for use wherever found applicable.

A particular object of the invention is to provide a relatively sensitive gauge for indicating fluid level.

Another particular object of the invention is to provide improved apparatus for indicating at a distance from a receptacle, the level of a liquid in the receptacle.

Still another particular object of the invention is to provide liquid level indicating apparatus which is operated electrically and is not rendered inaccurate by variations in voltage of the electricity.

Many other objects and advantages of the construction herein shown and described will be obvious to those skilled in the art from the disclosure herein given.

To this end my invention consists in the novel construction, arrangement and combination of parts herein shown and described and more particularly pointed out in the claim.

In the drawings, wherein like reference characters indicate like or corresponding parts:

Fig. 3 is a section taken on line 3—3 of Fig. 2;

Fig. 4 is a front elevation of the apparatus shown in Fig. 1;

Fig. 5 is a section taken on line 5—5 of Fig. 2; and

Fig. 6 is a section taken on line 6—6 of Fig. 5.

Figure 1:
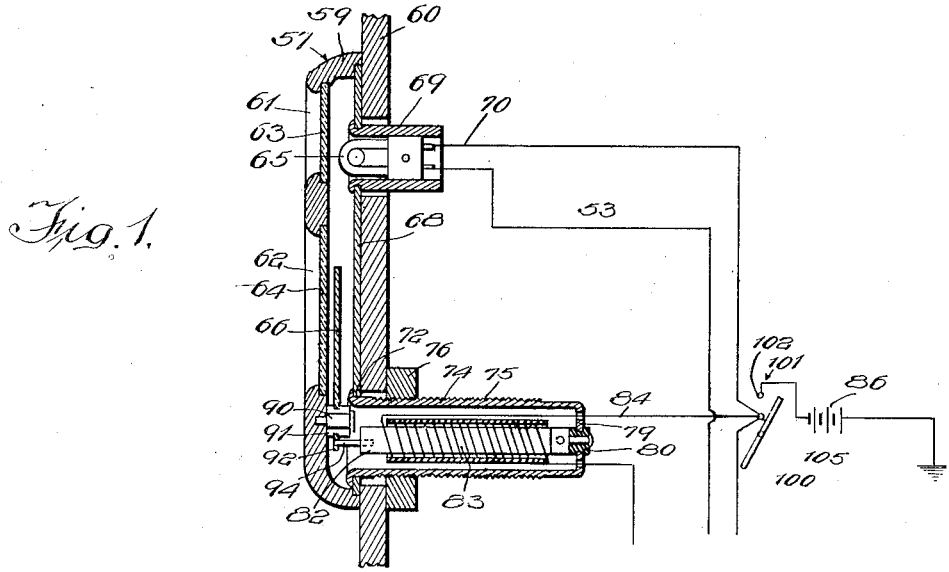
Fig. 1 is a central section taken through part of the apparatus embodying the invention.

In the drawings, I have shown a preferred form of the invention embodied in a gauge for indicating fluid levels, the apparatus being shown in connection with a metallic receptacle 10, such as, for instance, a gasoline tank of the kind commonly employed upon automobiles or the like. The tank 10 comprises an upper wall 11 having an opening 12 therein which is closed in this instance by a metallic plate 14 which cooperates with a housing member 15 to form a chamber 16. The chamber 16 communicates with the atmosphere through one or more openings 18 provided in the housing member 15. Rigidly secured to the plate 14 and projecting downward therefrom is a bracket member 19 terminating in bifurcations 20 which carry a pin 21 pivoting a lever 22. The free end of the lever 22 is preferably bifurcated as indicated at 23 and a float 24 is preferably pivoted between the bifurcations the pivoted end of the lever 22 is provided with an arcuate surface 26 or the equivalent, which is preferably eccentric with respect to the pivoted axis of the lever. Riding upon the arcuate surface 26 is the head 28 of a pin 29 which is slidably journaled in the bracket member 19, the head 28 being yieldingly held in engagement with the arcuate surface by a compression spring 30 disposed around the pin 29 and interposed between the head 28 and the bracket member 19. Obviously, when a change in the liquid level in the receptacle 10 causes the float 24 to rise or fall, the arcuate surface 26 will displace the pin 28 longitudinally. The pin 29 is preferably electrically connected to the plate 14 by a flexible electrical conductor 29a, although it also contacts with the member 19 which engages the plate 14.

Mounted upon the upper end of the pin 29 is a contact point 32 preferably formed of some suitable metal such as tungsten, the contact point 32 being engageable with a contact point 33 of similar construction secured to the free end of a thermostat 34 which has its other end secured to an insulating block 36 carried by the housing member 15. The thermostat may be of any suitable construction but preferably is of the bimetallic type, the construction being such that when the thermostat is subjected to heat it will flex in one direction and when the temperature falls, the thermostat will flex in the other direction. Disposed around the thermostat 34 and insulated therefrom throughout its greater portion is a winding 39 which has one of its ends or terminals electrically connected to the thermostat as indicated at 40 in Fig. 2, the other terminal of the winding 39 being connected to an electrical conductor 42 for a purpose described hereinafter.

Mounted upon the extreme free end of the thermostat 34 is an insulating sleeve 44 engageable with one end of a lever 46 which is pivoted intermediate its ends to a post 47 mounted upon the housing member 15. The free end of the lever 46 is provided with a contact point 49 engageable with a screw threaded post 50 adjustably mounted in the housing member 15, nuts 51 being provided upon the post 50 so that one end of a conductor 53 may be attached thereto. A spring 55 tends to rotate the lever 46 in a counter-clockwise direction (Fig. 6) to hold it in engagement with the insulating sleeve 44. Obviously, when the thermostat 34 flexes in such manner that its free end moves downward, the lever 46 will be displaced in a clockwise direction (Fig. 6) against the action of the spring 55 until the contact point 49 engages the lower end of the screw threaded post 50.

Referring now to Figs. 1 and 4, the reference character 57 designates generally an instrument adapted to be mounted upon the dash or instrument board of an automobile, it being understood that the tank 10 is generally located at the rear of the automobile. In the illustrated embodiment of the invention, the instrument 57 comprises a housing member 59 adapted to be secured upon the dash or instrument board, the dash or instrument board being designated by the reference character 60. The housing member 59 is preferably provided with sight openings provided with transparent panels 63 and 64 respectively, through which an incandescent lamp 65 and a pointer or hand 66 may be viewed. The rear side of the housing member 59 is preferably closed by a plate 68 to which a tubular member 69 is secured to accommodate the lamp 65. It will be noted that one terminal of the lamp 65 is connected to the conductor 53 and that the other terminal thereof is connected by a conductor 70 to a terminal 100 of an electrical switch 101 which also comprises a terminal 102, the terminal 102 being connected to one terminal of a storage battery 86, or the equivalent, which has its other terminal grounded. The electrical switch 101 is preferably the ignition switch of the automobile, the ignition switch being provided with a switch element 105 adapted to bridge the terminal 100 and 102 when the switch is closed.

Projecting through an aperture 72 formed in the cover plate 68 is a tubular member 74 which is externally screw threaded as at 75 so that a nut 76 may be employed to rigidly secure the tubular member to the cover plate 68 and the instrument board or dash 60. The tubular member 74 is preferably provided with an end wall 79 in which an insulating block 80 is mounted, the insulating block 80 being adapted to hold a thermostat 82 which, in this instance, is substantially identical with the aforementioned thermostat 34. Wound around the thermostat 82 is a winding 83 which has one of its terminals connected to an electrical conductor 84 and has the other of its terminals connected to the aforementioned electrical conductor 42. The electrical conductor 84 connects the winding 83 with the switch terminal 100.

The aforementioned pointer or hand 66 is preferably pivoted upon a pin 90 which projects from the housing member 57, the pointer or hand 66 comprising, in this instance, a stamping mounted upon the hub 91. A slot 92 formed in the pointer or hand 66 is engaged by a pin 94 which projects from the free end of the thermostat 82. As best shown in Fig. 4, the plate 68 has a scale 96 stamped or otherwise marked thereon, the scale 96 being calibrated to indicate in fractions the extent to which the tank 10 is filled with liquid.

The operation of the above described apparatus is substantially as follows: When the automobile is placed in operation, the ignition switch is closed in the usual manner so that the switch terminals 100 and 102 are bridged by the switch element 105. Assuming now that the liquid level in the tank 10 is substantially that indicated by the dotted line 98 in Fig. 2, it is obvious that an electrical current will flow as follows: From the battery 86 through terminal 102, the element 105, the terminal 100, the conductor 84, the winding 83, the conductor 42, the winding 39, the free end of the thermostat 34, the contacts 33 and 32, and through the pin 29 to ground and thence return to the battery 86. The current flowing through the windings 39 and 83 will heat the thermostats 34 and 82 respectively and will cause these thermostats to flex or bend, the thermostat 34 being so constructed that it will flex or bend in a direction away from the pin 29. Obviously, when the free end of the thermostat moves into a position wherein its contact point 33 does not engage the contact point 32, the circuit through the windings 83 and 39 will be opened and the thermostats will cool so that the thermostat 34 will again bring its contact point 33 into engagement with the contact point 32 whereupon electrical current will again flow through the windings 39 and 83. This cycle of operations will continue until substantially all of the liquid in the tank 10 is withdrawn therefrom, whereupon the arcuate surface 26 will permit the spring 30 to bring the pin 29 into a position wherein it allows the insulating sleeve 44 to angularly displace the lever 46 in a clockwise direction (Fig. 6) so that the contact point 49 engages the screw threaded post 50. An electrical current will then flow as follows: From the battery 86 through the terminal 102, the element 105, the terminal 100, the conductor 70, the filament of the lamp 65, the conductor 53, the screw threaded post 50, the contact 49, the lever 46 and then through ground back to the battery. Obviously, the lamp will then signal that the supply of fuel in the tank 10 is nearly exhausted.

Figure 2:
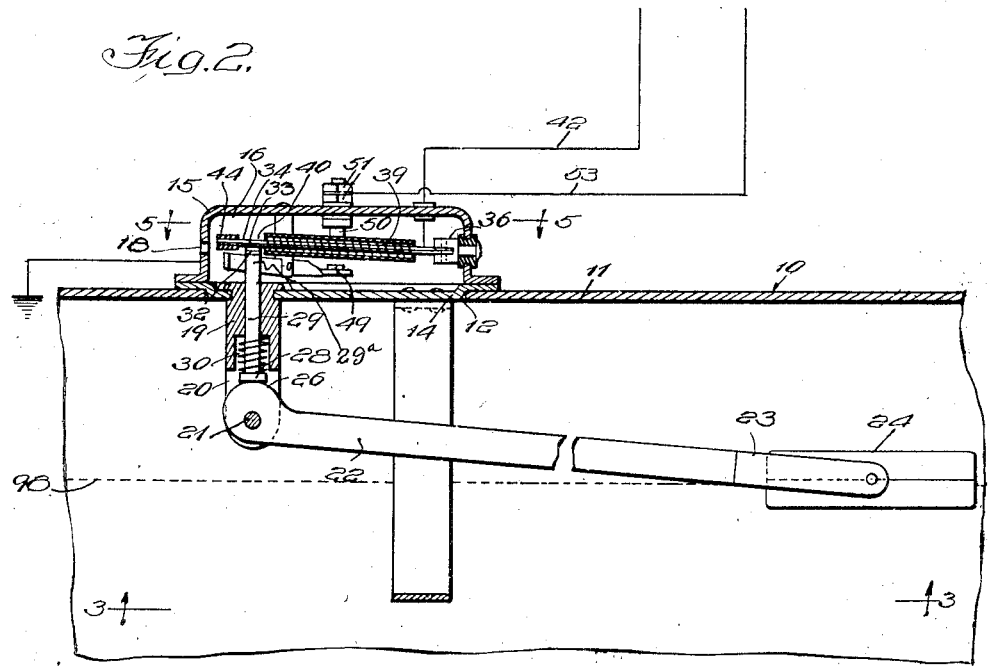
Fig. 2 is a central vertical section taken through another part of the improved apparatus.

The arrangement of the thermostats 34 and 82 and the parts cooperating therewith is similar to the arrangement of the thermostats and cooperating mechanism shown in my copending application, Serial No. 133,426, filed Sept. 3, 1926. It is readily understood that the position of the pin 29 controls the amount of heat to which the thermostat 34 is subjected and that the amount of heat to which the thermostat 82 is subjected is substantially proportional to that to which the thermostat 34 is subjected. When the pin 29 is in the position wherein it is shown in Fig. 2, and the tank 10 is substantially full, the thermostat 34 makes more effective contact with the pin 29 over the given period of time than it does if the pin 29 is in one of its lower positions. As the thermostat 82 is subjected to a proportional amount of heat with respect to the thermostat 34, it is readily understood that its free end will move or flex into positions wherein it will cause the hand or pointer 66 to register or indicate upon the scale 96 the extent to which the tank 10 is filled with liquid.

Having thus described my invention, it is obvious that various immaterial modifications may be made in the same without departing from the spirit of my invention, hence I do not wish to be understood as limiting myself to the exact form, construction, arrangement and combination of parts herein shown and described or uses mentioned.

What I claim as new and desire to secure by Letters Patent is:

In an electrical indicating system for an automotive vehicle, a liquid container carried by the vehicle, a float therein, an electric control device comprising a walled housing supported on the container externally thereof, a peripherally sealed passageway between the housing and the container interior, a thermostatic element supported in the housing, an electric heater therefor, a movable element, a motion reducing mechanism operable through the passageway, transmitting float movement to the movable element, a pair of controlling contacts disposed in the housing adapted to be engaged and disengaged by said movable element responsive to up and down movements of the float caused by movements of the vehicle, a source of electrical current, a remotely disposed slowly operable indicator, an electrical circuit comprising said contacts, said heater, said source of current and said indicator, said contacts controlling the flow of current from the source to both said heater and said indicator, said thermostatic element being cumulatively operable responsive to cumulative heating of said heater, whereby said indicator is substantially non-responsive to the effects of vehicle movement upon said float and indicates the average position of said float in said container.

In testimony whereof, I have hereunto signed my name.

THEODORE J. SMULSKI.